Patented Oct. 21, 1924.

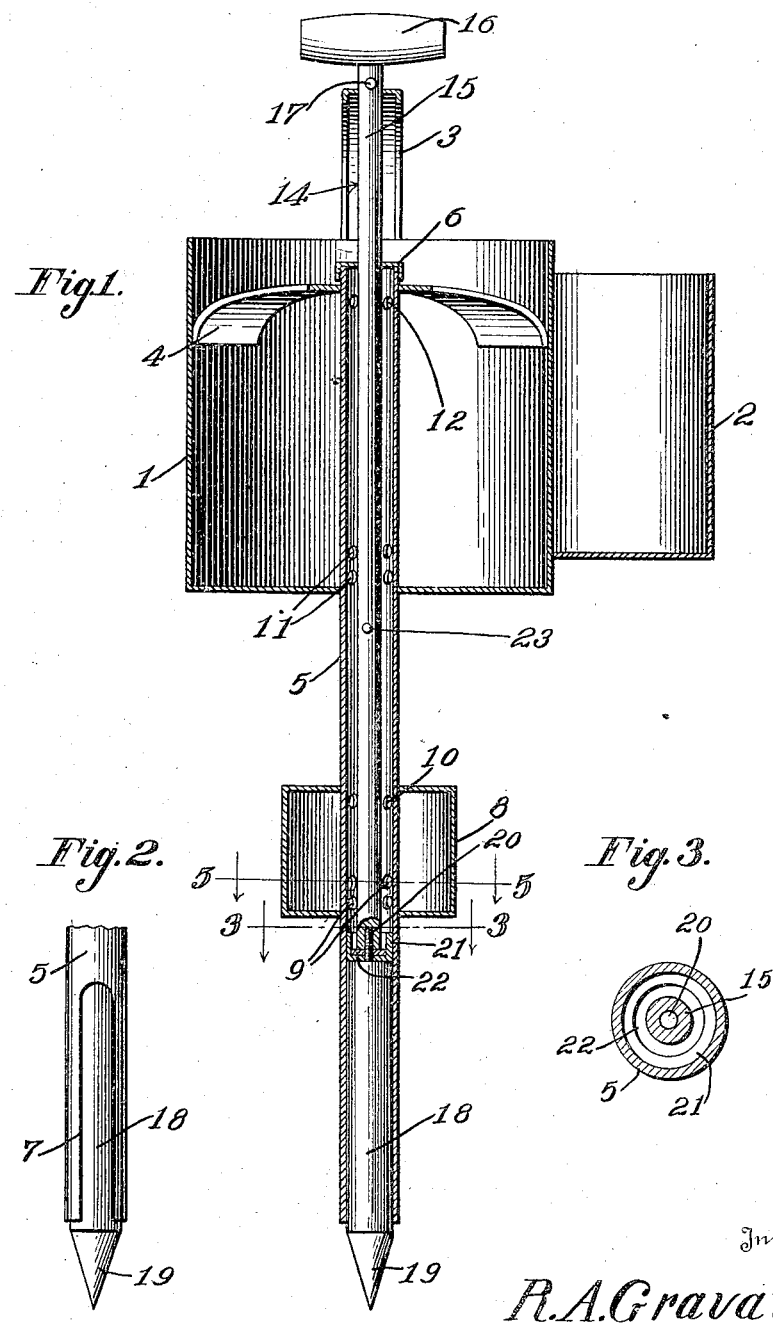

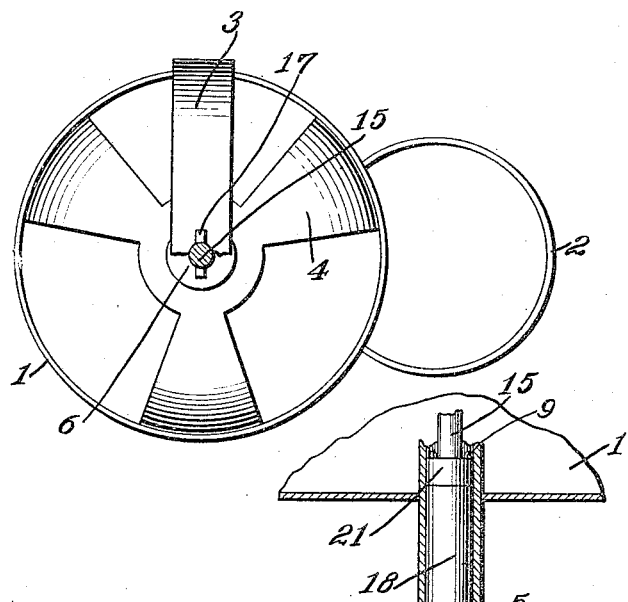
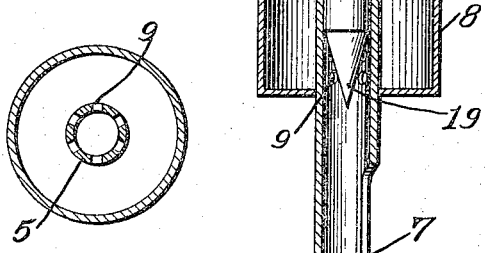

1,512,758

UNITED STATES PATENT OFFICE.

RALPH A. GRAVATT, OF EMPORIA, KANSAS.

PLANT-WATERING DEVICE.

Application filed October 19, 1921. Serial No. 508,856.

*To all whom it may concern:*

Be it known that I, RALPH A. GRAVATT, a citizen of the United States, residing at Emporia, in the county of Lyon and State of Kansas, have invented a new and useful Plant-Watering Device, of which the following is a specification.

This invention aims to provide a simple means whereby a measured quantity of water may be delivered about the roots of a plant, when the plant is set in the ground.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention; parts appearing in elevation; Figure 2 is an elevation showing the lower end of the tube; Figure 3 is a cross section on the line 3—3 of Figure 1; Figure 4 is a top plan wherein parts are broken away; Figure 5 is a cross section on the line 5—5 of Figure 1; and Figure 6 is a fragmental longitudinal section.

In carrying out the invention there is provided a tank 1 supplied with a carrier 2 adapted to receive the plants, prior to the setting of the plants. A handle 3 is mounted on the tank 1 and upstands from the same. A frame 4 is located within and secured to the tank 1. A tube 5 extends through the bottom of the tank 1 and is mounted adjacent to its upper end in the frame 4. The upper end of the tube 5 may carry a cap 6. At its lower end, the tube 5 is supplied with an elongated slot 7.

A measuring receptacle 8 surrounds the tube 5 below the tank 1 and is carried by the tube. The tube 5 has water ports 9 communicating with the measuring receptacle 8 and located adjacent to the bottom thereof. The tube 5 is provided with air ports 10, communicating with the measuring receptacle 8 and located adjacent to the top thereof. The tube 5 is supplied with water ports 11 communicating with the tank 1 and disposed adjacent to the bottom of the tank. The tube 5 has air ports 12 communicating with the tank 1 and disposed adjacent to the upper end of the tank.

The device includes a plunger 14, which is a composite structure. The plunger 14 embodies a stem 15 located within the tube 5 and mounted to slide in the cap 6 and in the handle 3. At its upper end, the stem 15 of the plunger carries a grip 16. A stop 17 is mounted in the stem 15 and, cooperating with the handle 3, limits the downward movement of the plunger. The numeral 18 denotes a head of such diameter as to fit closely but slidably in the tube 5, the stem 15 being of appreciably less diameter than the internal diameter of the tube. The head 18 has a point 19 at its lower end. At its upper end, the head 18 is supplied with a reduced extension 20, in the form of a screw, the screw being threaded into the lower end of the stem 15. A piston 21, which may be a cup leather, is mounted on the screw 20 and fits closely in the tube 5. A washer 22 is mounted on the screw 20 and is superposed on the piston 21. Obviously, when the screw 20 is threaded into the lower end of the stem 15, the piston 21 and the washer 22 will be bound between the lower end of the stem 15 and the upper end of the head 18, it being possible, however, to detach the head at any time, so that the cup leather or piston 21 may be renewed.

Let it be supposed that the parts are arranged as shown in Figure 1. Then, the water in the tank 1 may be considered to have flowed downwardly through the tube 5, by way of the water ports 11, and to have entered the measuring receptacle 8, through the water ports 9, the measuring receptacle 8 being filled with water, the air escaping first into the tube by way of the air ports 10, and then out of the tube, by way of the air ports 12: the head 18 of the plunger 14 and, particularly, the piston 21, preventing the water from flowing downwardly out of the tube 5 at the lower end thereof. The lower end of the device is thrust into the ground, the point 19 of the head 18 facilitating such an operation. A hole is opened in the ground, and the plant is removed from the carrier 2 and seated in the hole. The plunger 14 is raised, into the position shown in Figure 6, whereupon, the measured quantity of water in the receptacle 8 flows downwardly, through the water ports 9, into the lower end of the tube 5, and out of the tube, about the plant, through the slot 7.

The device forming the subject matter of this application embodies a simple but efficient means whereby, as hereinbefore indicated, a measured quantity of water may be delivered about the roots of a plant, whilst the plant is being set in the ground.

It is to be observed that the stem 15 is provided with a stop 23, adapted to engage the cap 6 when the stem 15 is raised, thus limiting the upward movement of the stem and stopping the piston 21 in a position below the water ports 11, thereby preventing the escape of water from the tank 1, whilst the plant is being set.

What is claimed is:—

1. In a device of the class described, a measuring receptacle, a tank thereabove, a tube passing through the receptacle and extended into the tank and supporting the receptacle and the tank, the tube having a liquid outlet port communicating with the receptacle and located adjacent to the bottom of the receptacle, an air outlet port communicating with the receptacle and located adjacent to the top of the receptacle, a liquid inlet port communicating with the tank and located adjacent to the bottom of the tank, and an air outlet port disposed at the upper end of the tube; a plunger comprising a stem, and a head slidable in the tube; means for limiting the downward movement of the plunger to dispose the head below the liquid outlet port but within the tube; and means for limiting the upward movement of the plunger to dispose the head in closed relation with respect to the liquid inlet port.

2. In a device of the class described, a tank; a measuring receptacle; a tube communicating with the tank and the measuring receptacle, the tube being provided at its lower end with an elongated slot; a plunger slidable in the tube and including a stem and a head; a piston slidable in the tube and bound between the stem and the head; an arched handle mounted on the tank and projecting beyond one end of the tank; and a stop carried by the stem and cooperating with the handle externally of the handle.

In testimony that I claim the foregoing as my own, I have hereto affixed my signature in the presence of two witnesses.

RALPH A. GRAVATT.

Witnesses:
W. M. PRICE,
HAZEL E. GRAVATT.